July 8, 1930.　　F. E. D'HUMY ET AL　　1,770,099
GUIDE FOR BELT CONVEYERS
Filed Nov. 4, 1929
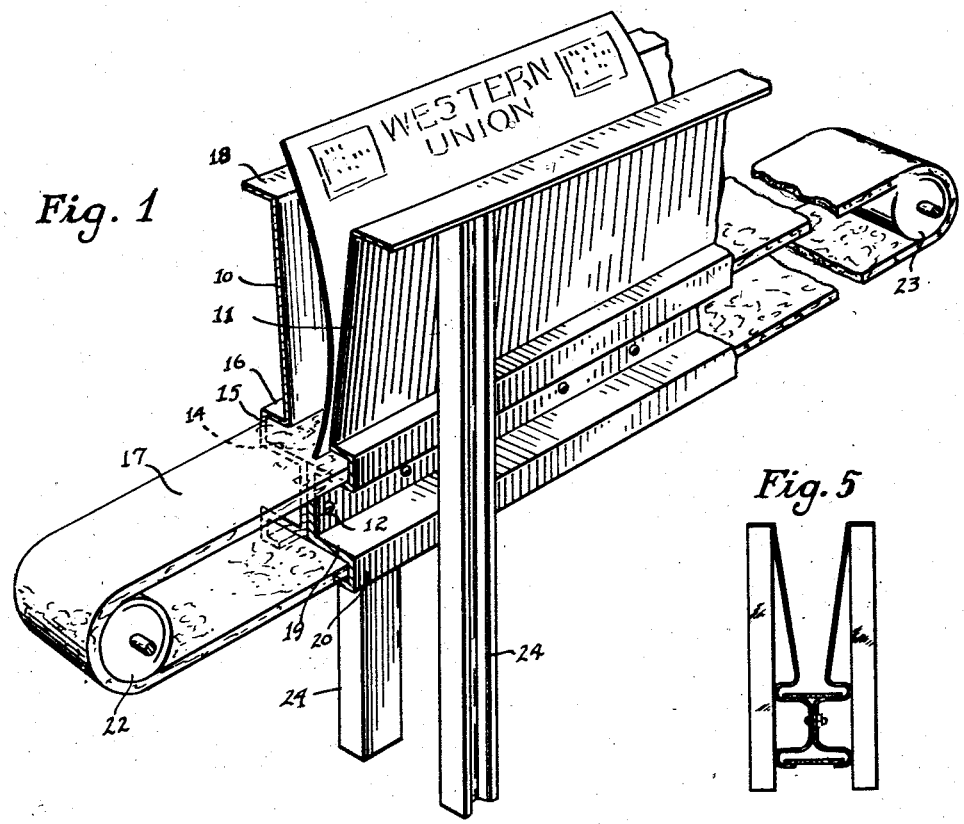
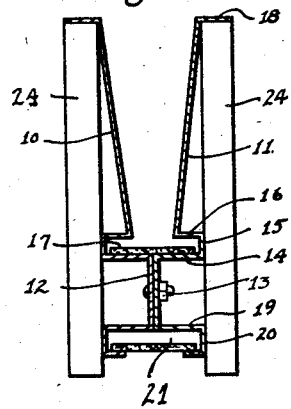
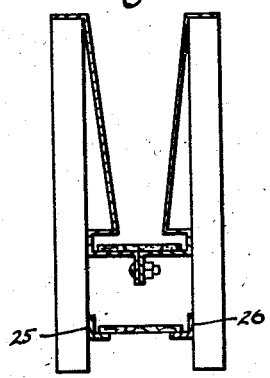
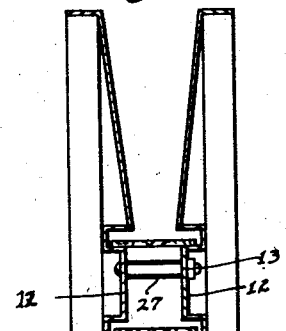
INVENTORS:
Fernand E. d'Humy
and Michael V. Creedon
BY
Eugene E. Brown
ATTORNEY

UNITED STATES PATENT OFFICE

FERNAND E. D'HUMY, OF SCARSDALE, NEW JERSEY, AND MICHAEL V. CREEDON, OF WESTFIELD, NEW YORK, ASSIGNORS TO THE WESTERN UNION TELEGRAPH COMPANY, OF NEW YORK, N. Y., A CORPORATION OF NEW YORK

GUIDE FOR BELT CONVEYERS

Application filed November 4, 1929. Serial No. 404,772.

This invention relates to a belt conveyer and more particularly to an endless conveyer for the transportation of flat articles such as telegrams and the like in a vertical or upright position.

In the handling of telegrams at a central office it is necessary, in some instances, to transport the telegram from one portion of the office to another. This is done expeditiously by employing a system of conveyers. One form of such conveyers consists of an open topped V-shaped trough conveyer so arranged that the telegrams or other articles will be held in a vertical or upright position so that the address, routing data, etc., may be read without removing the paper from the conveyer. Such conveyers are ordinarily termed V-belt conveyers due to the cross sectional shape of the trough and such a V-belt system is fully disclosed in a copending application of d'Humy, Birkmeyer and Griffith, Serial No. 350,751, filed March 13, 1929, and entitled Belt conveyers.

Briefly the form of conveyer disclosed in said application consists of a base plate, preferably an inverted channel having two sidewalls attached thereto and extending vertically above the base a slight distance then horizontally towards each other over the edge of the base and thence upwardly and divergently to form a substantial V-shaped trough open at the top and at the bottom. A housing or rectangular channel is thus formed by the base plate and the overlying side plates through which the conveyer belt travels with the belt sliding on the base plate. The return reach of the belt is guided on rollers or other means separate from the trough members and disposed therebelow.

The present invention is especially concerned with a conveyer of this general nature, one of the objects being to provide a simple construction of the trough and the guides for both the operating and return lengths of the belt.

Other objects and advantages will hereinafter appear.

In accordance with our invention we construct the side plates in such manner that they form both the V-shaped trough and the complete belt housing, thus eliminating the necessity for a separate base plate. They also may be of such shape as to form the guide and support for the return length of belt.

The construction of the conveyer will be fully understood by reference to the accompanying drawings in which:

Figure 1 is a perspective view, partly in section, of a conveyer embodying my invention;

Figure 2 is a vertical sectional view of the conveyer shown in Figure 1;

Figure 3 is a vertical sectional view of a modified form of conveyer;

Figure 4 is a vertical sectional view of a further form of the conveyer; and

Figure 5 is a vertical sectional view of a still further modification of the conveyer.

Referring first to Figures 1 and 2, it will be seen that the conveyer is composed of two side plates, 10 and 11, of similar shape secured together along contacting vertical web portions 12, by means of bolts 13 or other suitable fastening means. Immediately above the web portion 12 the plates extend horizontally outward away from each other to form a base portion 14 upon which the belt rests, then vertical upward at 15 and then horizontally inward towards each other to form shelves or ledges 16 overlying the belt. The parts 14, 15 and 16 form a substantially rectangular housing or conduit through which the belt 17 travels. From the inner edges of the ledges 16 the side plates extend upwardly and divergently to form a substantially V-shaped trough having an open bottom and an open top. Flanges 18 are provided at the top of the divergent walls. Below the web portion 12 the two side plates extend horizontally outward at 19, vertically downward at 20 and horizontally inward to form, together a second conduit 21, partially open at the bottom which serves as a guide and support for the return reach of the belt.

The upper reach of the conveyer belt, as stated above, travels through the rectangular enclosure at the bottom of the trough and slides on the portion 14, of each of the plates which form the bottom wall of the enclosure. The belt passes around end rollers 22 and 23 and the lower reach or return length of the belt is supported in the conduit 21. The belt is driven in any suitable manner as through one of the rollers 22 and 23.

Supporting posts or standards 24, which may be channel irons are employed to support the conveyer. The plates 10 and 11 are secured to the post 24 through the top flanges 19 which rest thereon and by the vertical wall portions 15 and 20.

With this arrangement telegrams deposited in the trough will be carried along in an upright position as shown and the lower part of the telegrams will be protected, by the overlying portion 16 of the housing, from catching beneath the belt.

In Figure 3 we have shown a modified construction in which the guide for the return length of the belt is formed of two separate angle irons 25 and 26, the construction otherwise being similar to Figures 1 and 2.

In Figure 4, we have shown a still further modification in which the web portions 12 are spaced apart by spacing sleeves 27 disposed on the clamping bolts 13. This form has the advantage that the area of contact of the belt through the guide ways is reduced thus reducing the friction therebetween. This arrangement also reduces the weight of the construction.

The construction shown in Figure 5 is similar to that shown in Figures 1 and 2 except that sharp angle bends are eliminated thus permitting the material to be more easily shaped. In this modification the main and return belt conduits are of oval cross section.

It will be noted that in each of the forms the trough or article guideway and the oblong conduit or belt guideway are formed entirely by the two side plates and therefore, that the conveyer may be assembled, by merely clamping the two plates together by the bolts 13. The plates 10 and 11 may be composed of relatively light material and may be readily rolled into the shape shown. A conveyer construction is thus provided which is light, simple and inexpensive and which may be quickly and easily assembled and disassembled.

It is obvious that numerous changes may be made in the details of construction and in exact shape of the plates 10 and 11 without departing from the invention and therefore we do not desire to be limited to the exact details shown and described except in accordance with the appended claims.

What we claim is:—

1. A belt conveyer having a trough provided with side walls and an open bottom, a housing beneath said trough of greater width than said trough, a conveyer belt travelling in said housing, said trough and housing being formed entirely by two opposed plates suitably shaped and secured together.

2. A belt conveyer having a trough provided with side walls and an open bottom, a housing beneath said trough of greater width than said trough, a guideway formed beneath said housing and an endless conveyer belt having an operating reach travelling in said housing and a return reach travelling in said guideway, said trough, housing and guideway being formed entirely by two opposed plates suitably shaped and secured together.

3. A belt conveyer comprising two longitudinally extending plates having vertical web portions secured together, said plates being shaped above said web portions to form a substantially oblong conduit having an opening at the top of less width than said conduit, said plates being further shaped to form a substantially trough shaped guideway above said housing and a conveyer belt travelling in said conduit, adapted to carry articles through said trough.

4. A belt conveyer comprising two longitudinally extending plates having vertical web portions secured together, said plates being shaped above said web portions to form a substantially oblong conduit having an opening at the top of less widths than said housing, said plates being further shaped to form a trough extending upwardly from said opening and being still further deformed below said web to form a second oblong shaped guideway and a conveyer belt having an operating reach travelling in said conduit and a return reach travelling in said guideway.

5. A belt conveyer comprising two longitudinally extending plates having vertical web portions secured together, spacing members between said web portions for maintaining the same in spaced parallel relation, said plates being deformed above said web portions to form a pair of opposed substantially horizontal belt guiding and supporting channels having horizontal lower and upper walls and a vertical sidewall and said plates extending upwardly and divergently from the inner edge of the upper walls of the channels to form a substantially V-shaped trough.

6. A belt conveyer comprising two longitudinally extending plates having vertical web portions secured together, said plates being deformed above said web portions to form two opposed substantially horizontal belt guiding and supporting channels having outwardly extending horizontal bottom walls, vertical sidewalls and inwardly extending horizontal top walls, the inner edges of said top walls being spaced apart and said plates extending upwardly and divergently therefrom to form an article guiding trough there above.

7. A belt conveyer comprising two longitudinally extending plates having vertical web portions secured together, said plates being deformed above said web portions to form two opposed horizontal belt guiding and supporting channels having outwardly extending horizontal bottom walls, vertical sidewalls and inwardly extending horizontal top walls, the inner edges of said top walls being spaced apart and said plates extending upwardly and divergently therefrom to form a trough there above, said plates also being deformed below said web portions to produce a horizontal support for the return length of said belt.

In testimony whereof we affix our signatures.

FERNARD E. D'HUMY.
MICHAEL V. CREEDON.